May 29, 1934.   R. C. FISHER   1,960,971
ROTARY ENGINE
Filed Dec. 5, 1930   5 Sheets-Sheet 1

ROY CLAUDE FISHER.
INVENTOR.

BY
ATTORNEY.

May 29, 1934.   R. C. FISHER   1,960,971
ROTARY ENGINE
Filed Dec. 5, 1930   5 Sheets-Sheet 2

ROY CLAUDE FISHER.
INVENTOR.

BY

ATTORNEY.

May 29, 1934.  R. C. FISHER  1,960,971
ROTARY ENGINE
Filed Dec. 5, 1930  5 Sheets-Sheet 3
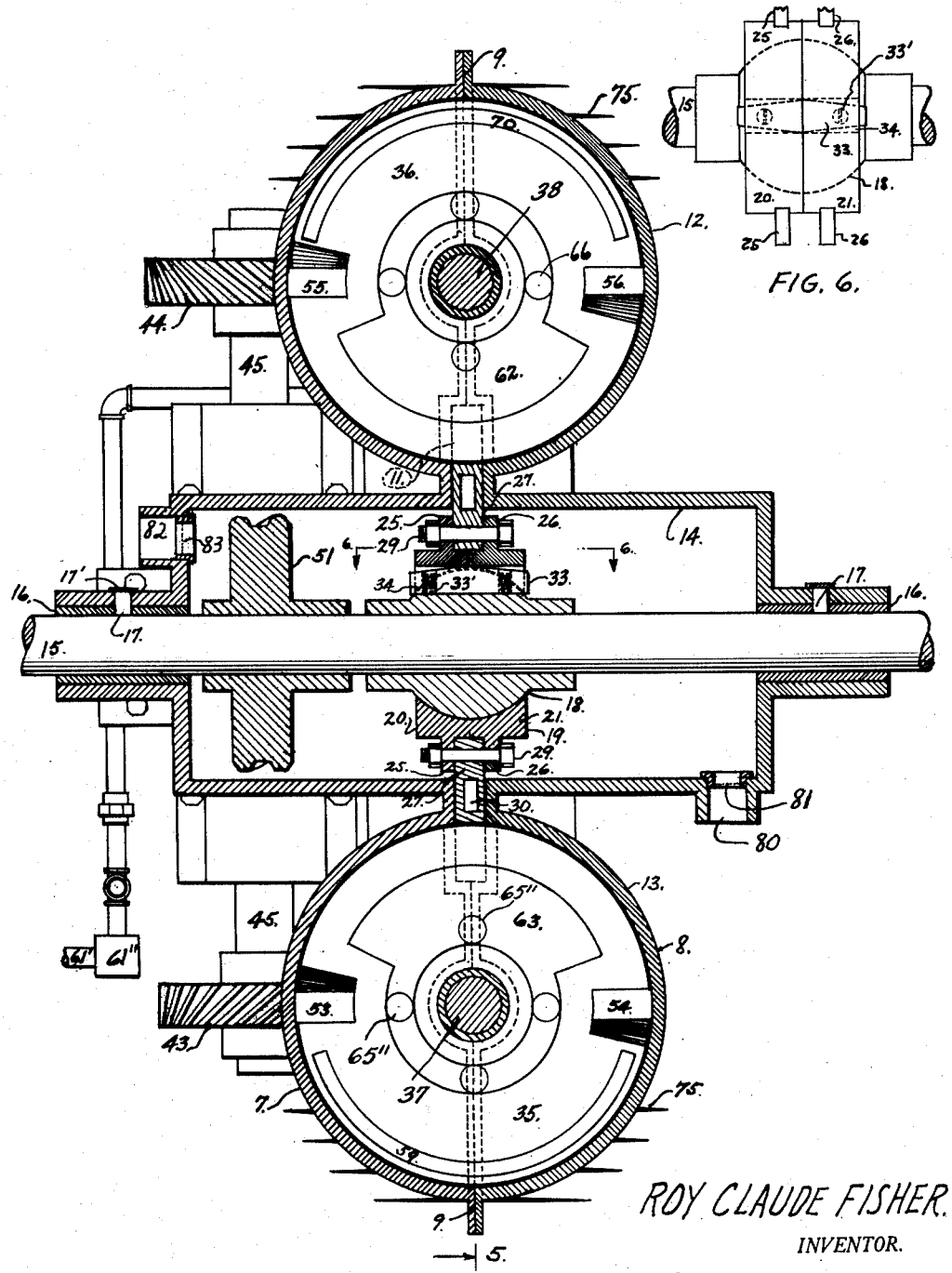
ROY CLAUDE FISHER.
INVENTOR.
BY [signature]
ATTORNEY.

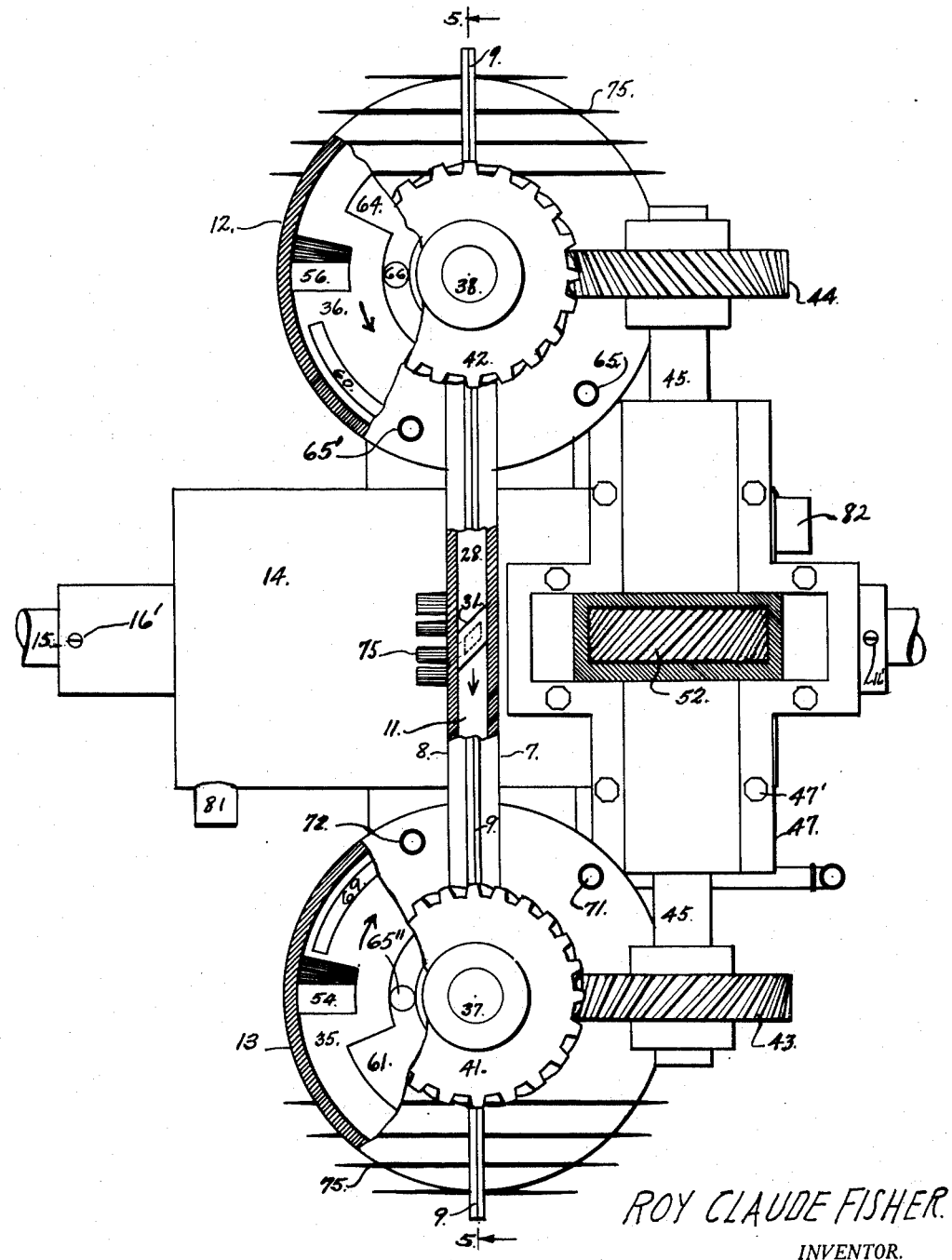

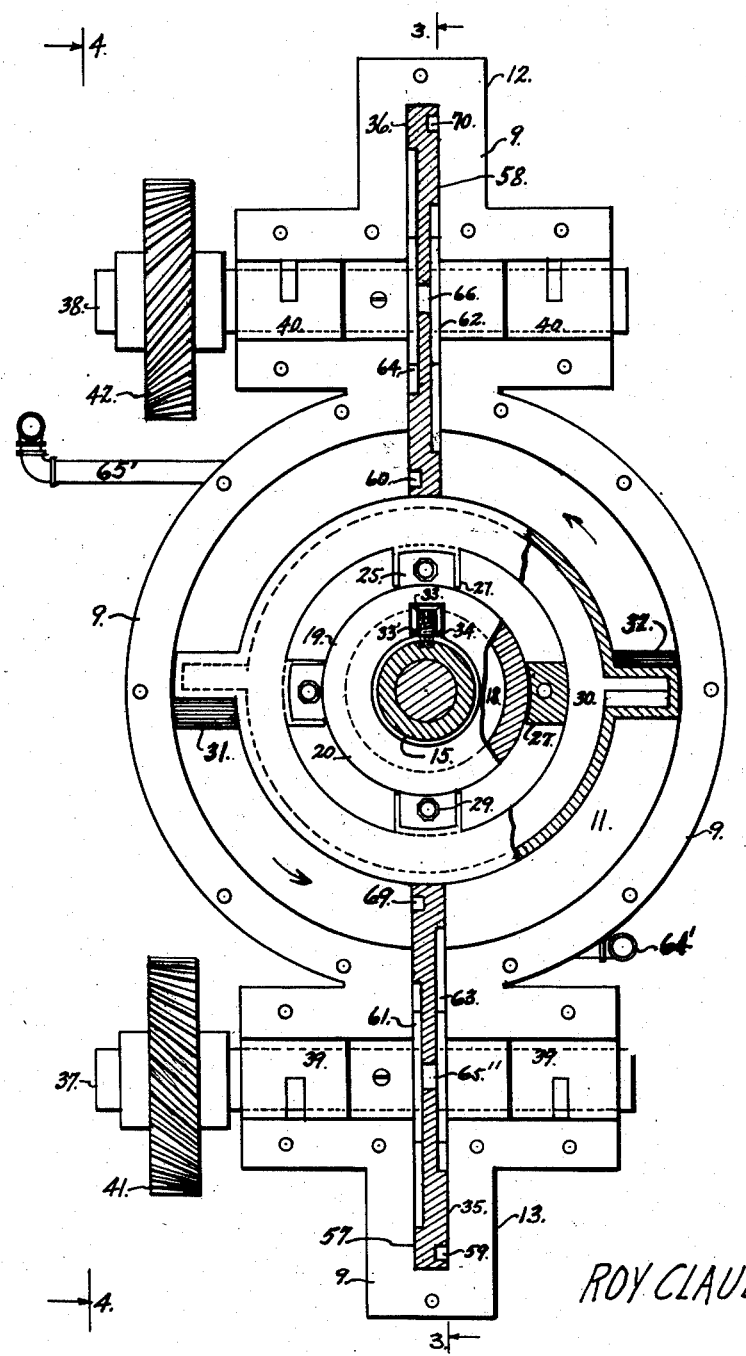

Patented May 29, 1934

1,960,971

UNITED STATES PATENT OFFICE 1,960,971

ROTARY ENGINE

Roy Claude Fisher, Atlanta, Ga.

Application December 5, 1930, Serial No. 500,207

5 Claims. (Cl. 123—13)

My invention relates to internal combustion engines and more particularly to rotary engines, and one of its objects is the provision of a rotary engine in which there is no reciprocating motion; such as is generally experienced in the reciprocating engine, and its valvular system.

Another object of my invention is the arrangement of rotatable abutments adapted to synchronize with pistons on a rotor so as to provide fuel intake, compression, ignition, and exhaust chambers; all of which are (at pre-determined periods) in operative relation with the circular cylinder of the engine.

A still further object is the provision of an engine capable of producing more ignitions, compressions, and intakes of a combustible, and more exhausts of a used combustible per revolution than the present day reciprocating engine.

Figure 1:
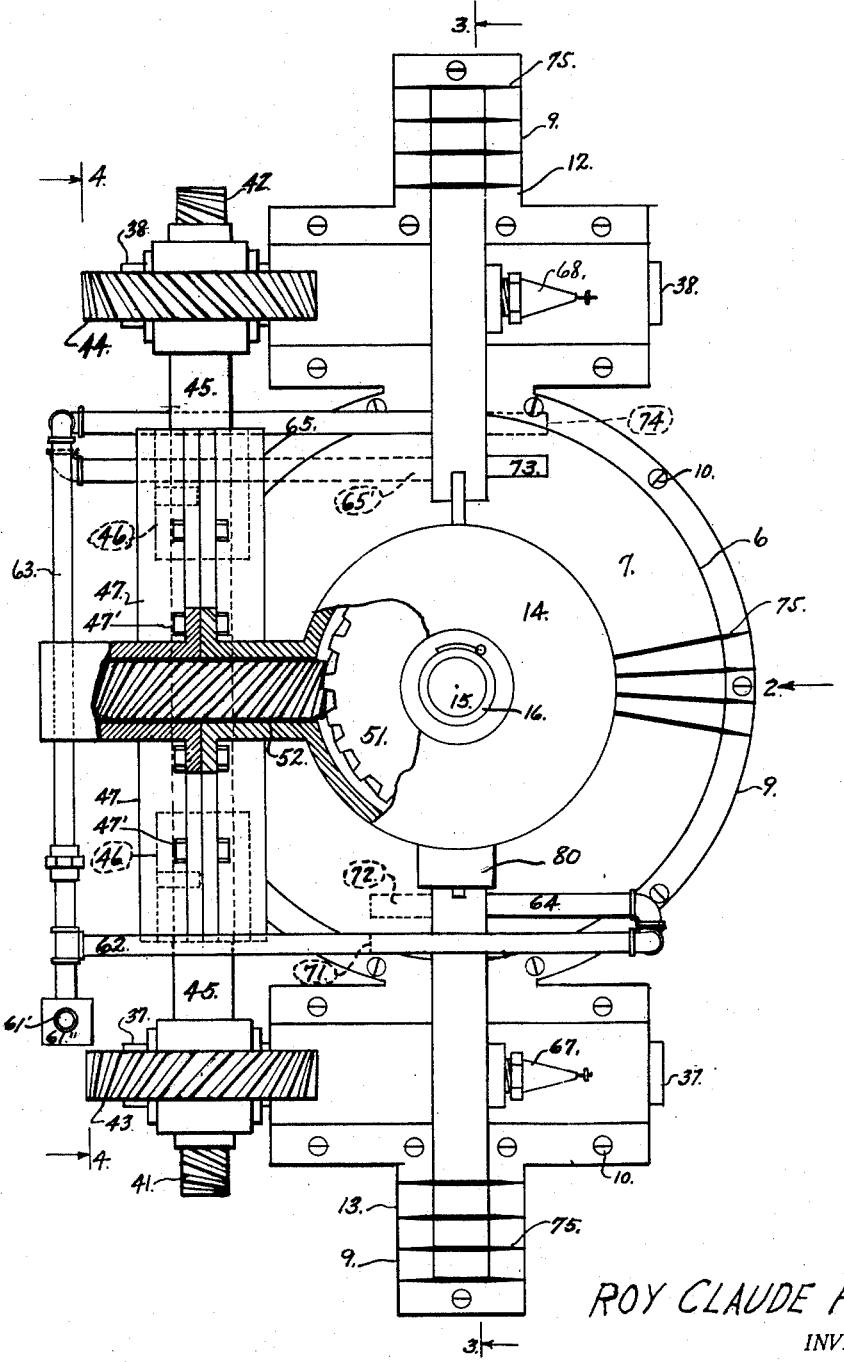
Figure 2:
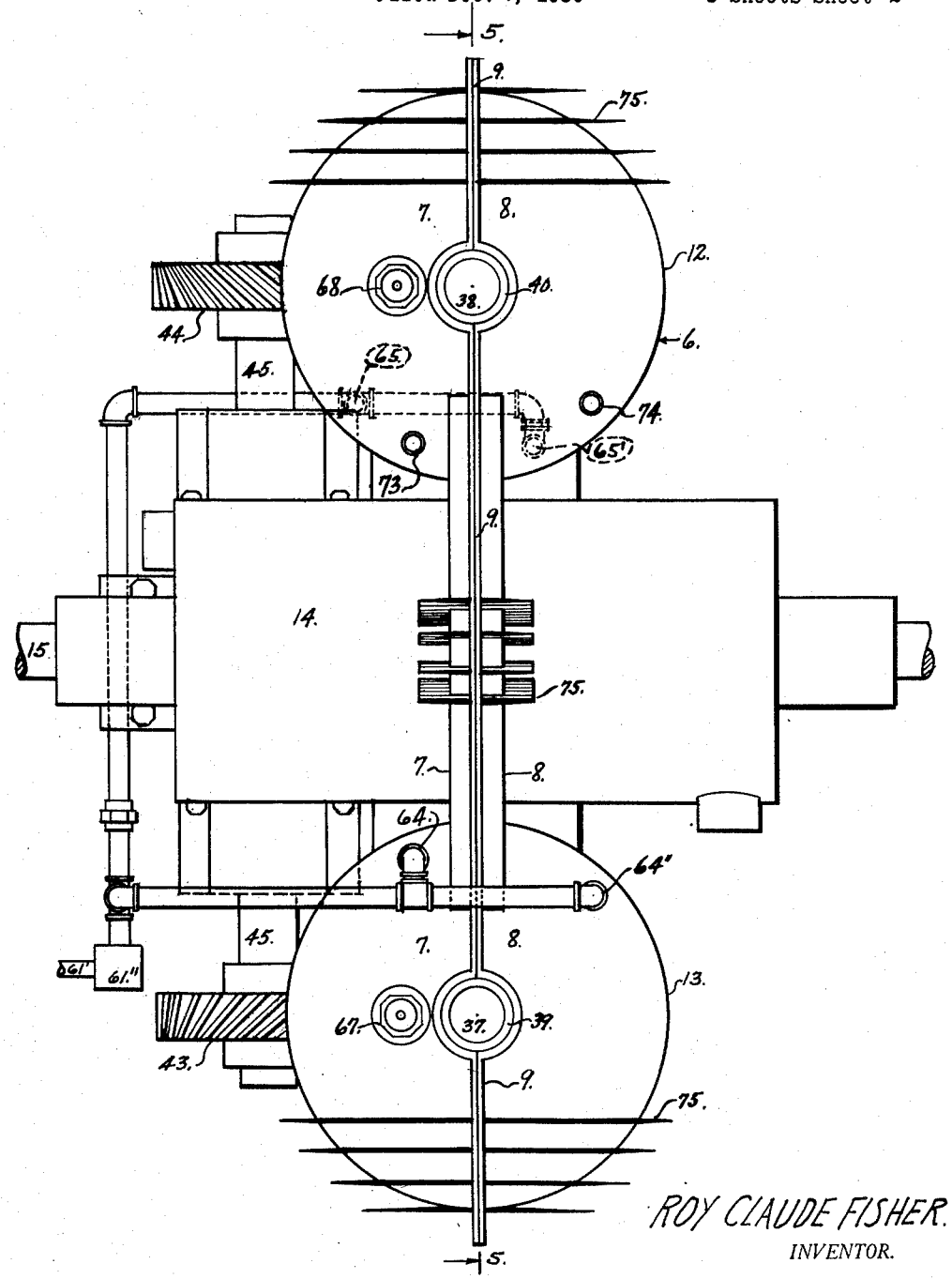

Other objects and features will more fully appear from the following description and accompanying drawings in which:

Fig. 1 is an end view; Fig. 2, a side view in direction of arrow 2 in Fig. 1; Fig. 3, a sectional side view in direction of arrow 3 in Fig. 1, and along lines 3—3 of Fig. 5; Fig. 4, a partial sectional side view in direction of arrow 4 in Fig. 1; Fig. 5, a sectional end view along lines 5—5 of Figs. 2 or 4, and Fig. 6, a top plan view of the ball, socket and pin, taken along lines 6—6 of Fig. 3.

Referring to the drawings (Figs. 2 and 3) a casing 6 formed by sections 7 and 8 secured together at their flanged portions 9 by screws or bolts 10; consist of a cylinder 11, and diametrically opposed housings 12 and 13 each communicating with said cylinder near its periphery. Each of said sections is integral and forms a semi-cylinder and housing, as clearly illustrated in Fig. 5. The casing 6 may be supported by a base (not shown) or secured to a vehicle adapted to accommodate engines of the internal combustible type.

The cylinder is provided with a longitudinal body 14 (Fig. 3), and a rotatable shaft 15 (substantially within the interior of said body) is journalled in removable bearings 16 (secured by screws 16') supported by said body. Lubrication of said shaft may be effected by the use of oil wicks (not shown) inserted in bearing slots 17, covered by hinged caps 17'.

A ball 18, secured to said shaft 15, is adapted to accommodate a circumferential socket 19; formed by sections 20—21. Each of said sections is respectively provided with flanges 25—26 (Figs. 3 and 5) which are adapted to accommodate lugs 27 of a rotor 28. The socket is secured to the ball, and the rotor lugs to the flanges by bolts 29. The rotor has a latent aperture 30 to facilitate cooling, and is provided with hollow diametrically opposed pistons 31—32 on the periphery thereof, which are disposed in said cylinder. It is obvious from the foregoing that (Figs. 3 and 5) the rotor closes the lower portion of the substantially U shaped cylinder, and when the shaft is actuated, the pistons rotate about the axis thereof.

Displacement of the socket 19 with respect to the ball in the direction of the rotation of the rotor is prevented by the provision of a tapered key 33 disposed in a rectangular shaped slot 34 formed by the ball 18 and socket 19, and secured by screws 33' to the basil portion of said ball. The key projects slightly beyond the periphery of said ball and a portion of the socket rests upon the apex of said key.

If the axle should get out of alignment it will exert a force through the ball against the socket, which will be retarded by the cylinder through the rotor connected to said socket.

It is therefore obvious that when such a force is exerted against the socket and retarded by the cylinder, the former will slip about the ball and assume its normal position with respect to said cylinder. Fig. 6 shows a top plan view of the pin and slot, and the space between these two members for permitting horizontal displacement.

The housings 12 and 13 are respectively provided with rotatable abutments 35—36 secured to shafts 37—38 journalled in bearings 39—40 in the respective housings. Gears 41—42 (Fig. 5) respectively connect said shafts 37—38 and mesh with gears 43—44 (Fig. 4) secured on a shaft 45 journalled in bearings 46 in a sectional journal 47 fastened by bolts 47' and to the casing 6. A gear 51 on shaft 15 meshes with a gear 52 on shaft 45, (Fig. 1) and it is obvious that when shaft 15 is actuated motion will be transmitted through gears 51—52, shaft 45, gears 43—44, 41—42, shafts 37—38 and the gates (which are synchronized by such gearing system) will rotate.

The abutments 35—36 (Fig. 3) are respectively provided with apertures 53—54; 55—56, and are respectively disposed in slotted chambers 57—58 (Fig. 5) in said housings. These chambers are at right angles with respect to the cylinder and the abutments are adapted to obstruct the cylinder, except when the apertures register with it.

When the diametrically opposed pistons are being actuated about the cylinder (Fig. 5) movement of the abutments is synchronized by the gear mechanism heretofore described so as to rotate and thereby register the apertures with the cylinder and thus permit the pistons to pass simultaneously. Except when the apertures register with the cylinder it is at all times obstructed by the abutments.

The abutments 35—36 are respectively provided with intake grooves 59—60 (Figs. 3 and 4) which are in operative relation with apertures in the cylinder wall that respectively register with pipes 64—64'; 65—65' connecting carburetor 61" to which is supplied a combustible from a source of power (not shown) through pipe 61'.

It will be observed from Fig. 2 that pipes 64—65 are located to one side of the cylinders; while pipes 64'—65' are located to the other sides. By thus arranging the pipes constant flow of a combustible may be accomplished as follows:

It will be observed from Fig. 4 that as the abutment 36 rotates the groove 60 approaches the cylinder 11, and the piston 31 passes through aperture 55. As the piston passes through said aperture the forward portion of the groove is beyond the pipe line 65' and the combustible is not drawn in until the edge of the groove reaches the cylinder.

It is obvious, therefore, that a large portion of the groove is empty before the combustible is drawn in by the piston. To supply this vacant space, pipe line 65 is placed on the opposite side of the cylinder and throughout the period piston 31 draws in a combustible (which is one half revolution) and a constant supply of a combustible is available. Groove 59 works in a similar manner with respect to the constant supplying of a combustible.

The discs are also respectively provided (on each side) with oppositely disposed compression-ignition chambers 61—62, 63—64. The compression chambers 61—62 in the respective discs 35—36 communicate with the ignition chambers 63—64 by apertures 65"—66. When the forward portion or piston 32 (Fig. 5) compresses the combustible along the cylinder said combustible passes into the compression chamber 62 and as the pistons pass the abutments, the discs obstruct the cylinder, and also rotate so as to permit the ignition chamber of one disc (in this case 36) to release the compressed combustible into said cylinder.

Upon the release of this combustible it is ignited, and the expanding gas forces the piston forward. Ignition of the combustible is caused by spark plugs 67—68 electrically connected and respectively communicating with said ignition chambers, and timed so as to synchronize with the expulsion of the compressed combustible into the cylinder.

It might be stated at this point that the apertures in said abutments at an angle (Fig. 5) as are the pistons (Fig. 4) thereby permitting constant division of said cylinder. It might also be added that the rotor has a concave edge to coincide with the discs' concave periphery, and this ensures a tight sliding basic joint between said abutments and rotor.

Exhaust grooves 69—70, respectively disposed in discs 35—36 communicate with outlet pipes 71—72, 73—74. After the combustible has been utilized the gaseous substance is left in the chamber, and (Fig. 5) as piston 31 moves along the cylinder it forces said used gaseous substances into the exhaust groove 69 where it passes through pipes 71—72 from the engine. It is of course understood, that the disc 35, when the piston 31 passes disc 36, has moved into a position which places groove 69 in communication with the cylinder and thus open.

By the provision of fins 75 (Fig. 1) a means of cooling the engine is obtained. It is also understood that water cooling system may be utilized (such for instance as the use of water jacket), or methods used in my two previous applications Serial Numbers 303,055 and 323,078.

The housing and rotor may also be cooled by the provision of an air inlet 80 covered by a screen 81, and an outlet 82 obstructed by a similar screen 83.

Lubrication of the cylinder, pistons and rotor may be effected by putting oil in the combustible supplied to the engine which, of course, will be carried to the various working parts of said members.

In order to clearly understood the function of this engine it is helpful to note that the rear side of piston 31 always creates a vacuum that intakes a combustible; the front side always exhausts the gas from a used combustible; while the rear side of piston 32 always receives the "fire" or forces exerted by the ignited combustible, and its front side always compresses the combustible.

When the rotor is turned the diametrically opposed pistons move through the cylinder. As piston 31 (Fig. 5) moves through the left section of the cylinder it creates a vacuum and causes a combustible to be drawn into said cylinder through groove 60 that connects with a source of fuel supply heretofore described.

After the left side of the cylinder is filled with the combustible, piston 31 passes through the aperture in abutment 35 and piston 32 likewise passes through abutment 36.

The forward portion of piston 32 compresses the combustible in the left half of said cylinder into the compression and ignition chamber 61—65 the former having registered with the cylinder by rotation brought about by the synchronized gear system.

The piston 32 then passes through abutment 35 and the ignition chamber registers with the right half of the cylinder and the spark plug ignites this compressed combustible which expands against the abutment and piston; forcing the latter forward.

It will be understood that as soon as piston 32 compresses the combustible into the compression chamber 61 (or 62 as the case might be) the abutments (which are rotating) carry said chamber out of the path of the cylinder and register the ignition chamber (full of the compressed combustible) with the cylinder; when piston 32 is in position to receive the expanding gas.

As the piston 32 is forced forward through the right half of the cylinder (Fig. 5) the combustible (which was drawn in by piston 31) is compressed by the front of said piston into compression chamber 62 and as said piston passes through the aperture to the left side of the cylinder the ignition chamber is rotated into registration with said cylinder and the spark plug ignites the combustible, again forcing piston 32 forward. It is therefore obvious that two impulses per revolution is received by the piston.

Piston 31, passing through abutment 35 to the right side of the cylinder forces the used combustible from said cylinder through groove 70, which registers with it, and from said groove through the exhaust pipes leading from the engine, Having described my invention, I claim:

1. In a device of the character described the combination of a casing, a shaft rotatable in said casing, a ball on said shaft, a socket engaging said ball, a rotor connected to said socket, pistons secured to said rotor, a cylinder formed by said casing and adapted to accommodate said pistons, abutments engaging said cylinder, means for rotating said abutments and shaft to synchronize with the movement of said pistons; intake grooves respectively in said abutments adapted to receive a combustible and convey it to said cylinder. Ignition-compression chambers respectively in said abutments for receiving and housing a combustible from said cylinder and emitting an ignited combustible into said cylinder; and exhaust grooves respectively in said abutments through which a used combustible passes from said cylinder.

2. In a device of the character described the combination of a casing forming a cylinder; rotatable abutments mounted in said casing in operative relation with said cylinder, means in said abutments for conveying a combustible to said cylinder; means for conveying a used combustible from said cylinder; means for housing a compressed combustible, and means for releasing an ignited combustible into said cylinder.

3. In a device of the character described the combination in a casing forming a cylinder, of a shaft rotatable in said casing, a motor connected in pivotable fashion to said shaft, diametrically opposed pistons on said rotor for disposition in said cylinder; abutments rotatable in said casing and in operative relation with said cylinder, means respectively in said abutments for receiving a combustible from a source of supply and conveying it to said cylinder; means respectively in said abutments for receiving a compressed combustible from one side of said cylinder and discharging to the other side of said cylinder an ignited combustible, and means respectively in said abutments adapted to exhaust a used combustible from said cylinder.

4. In a device of the character described, the combination with a casing forming a cylinder, of abutments mounted in said casing and registering with said cylinder, said abutments having compression-ignition chambers for respectively receiving and releasing a compressed and ignited combustible; grooves in said abutments for admitting a combustible to said cylinder, and grooves in said abutments adapted to exhaust the gases of a used combustible from said cylinder.

5. In a device of the character described consisting of a casing forming a cylinder, diametrically opposed abutments rotatable in said casing and registering with said cylinder; means respectively in said abutments consisting of grooves for permitting the passage of a combustible into said cylinder; means respectively in said abutments for receiving a compressed combustible from said cylinder and release an ignited combustible into said cylinder; means respectively in said abutments consisting of grooves for permitting an exhaust combustible to pass from said cylinder; a rotor rotatable in said cylinder, and means in operative relation with said rotor and abutments for synchronizing the movement of the former with respect to the latter.

ROY CLAUDE FISHER.